J. R. KINNEY.
POWER TRANSMISSION DEVICE.
APPLICATION FILED APR. 13, 1918.

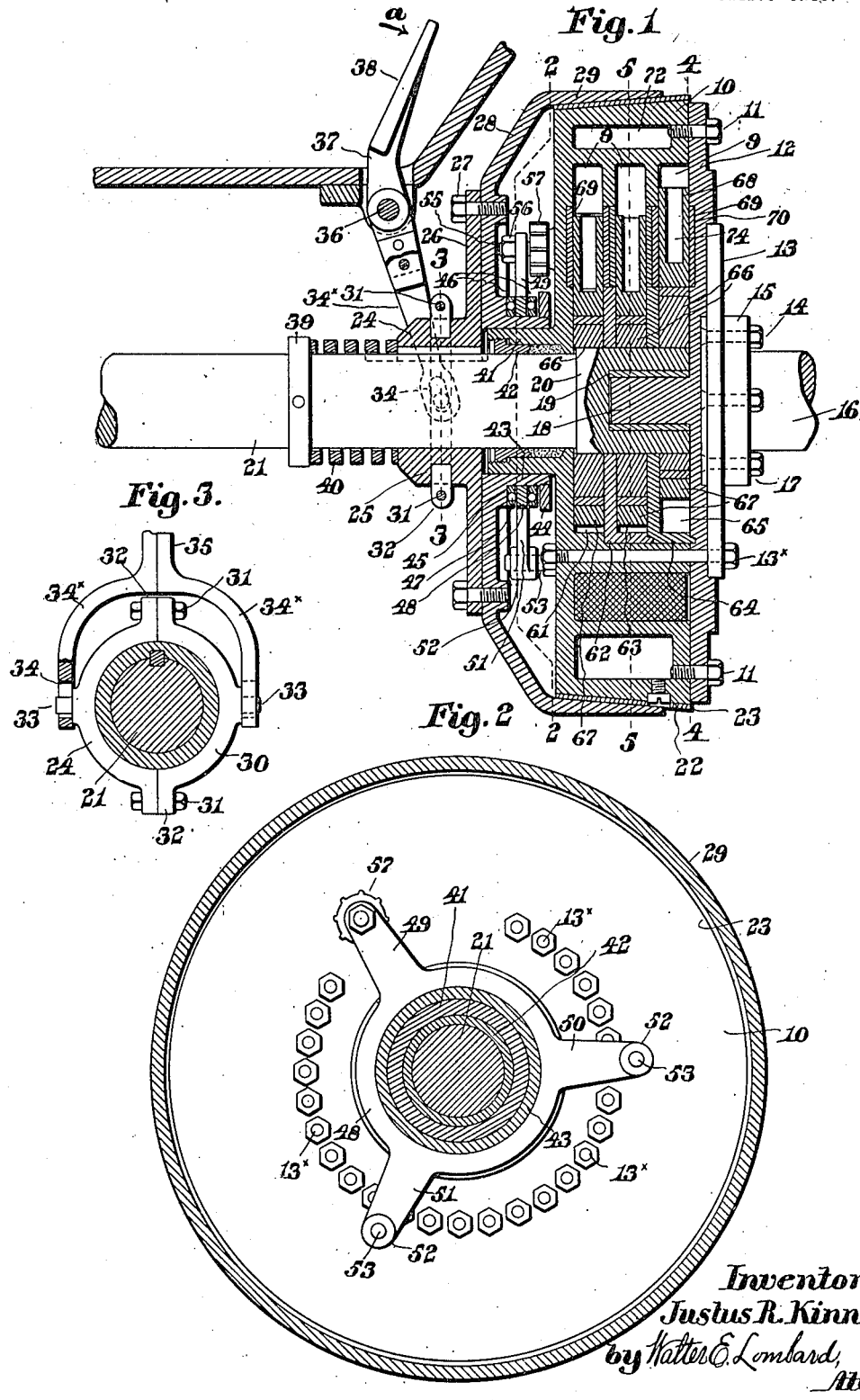

1,298,512.

Patented Mar. 25, 1919.
3 SHEETS—SHEET 2.

Inventor:
Justus R. Kinney,
by Walter E. Lombard,
Atty.

J. R. KINNEY.
POWER TRANSMISSION DEVICE.
APPLICATION FILED APR. 13, 1918.
1,298,512.
Patented Mar. 25, 1919.
3 SHEETS—SHEET 3.
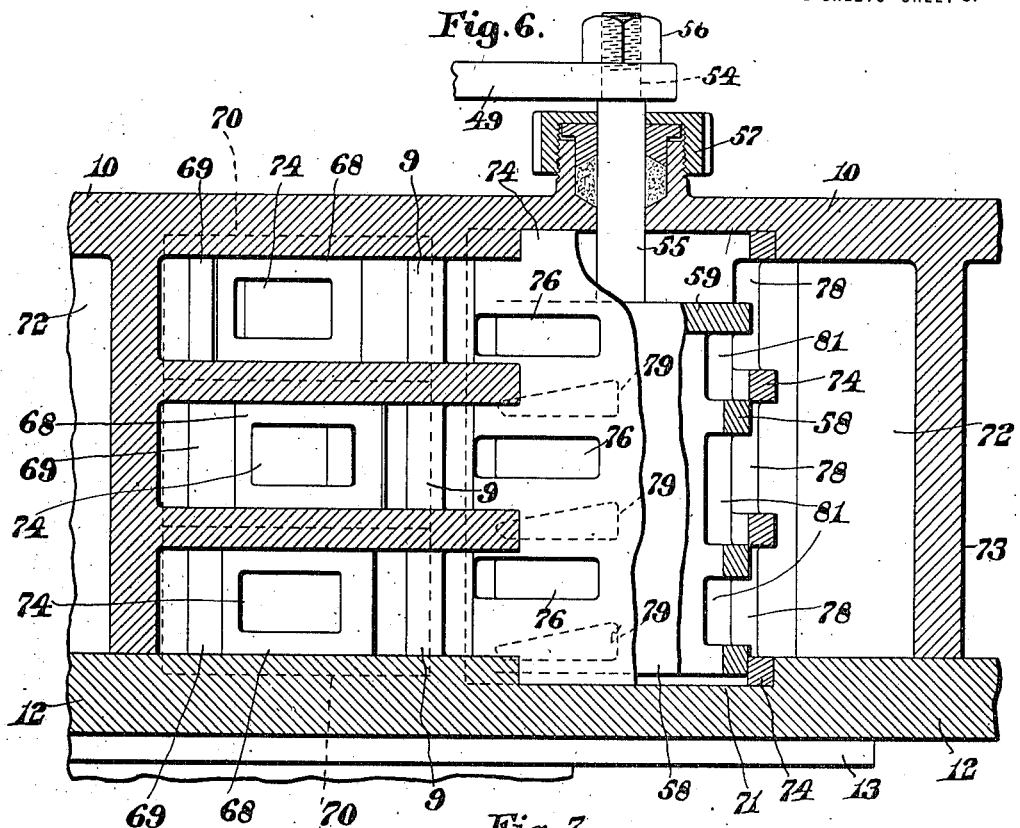
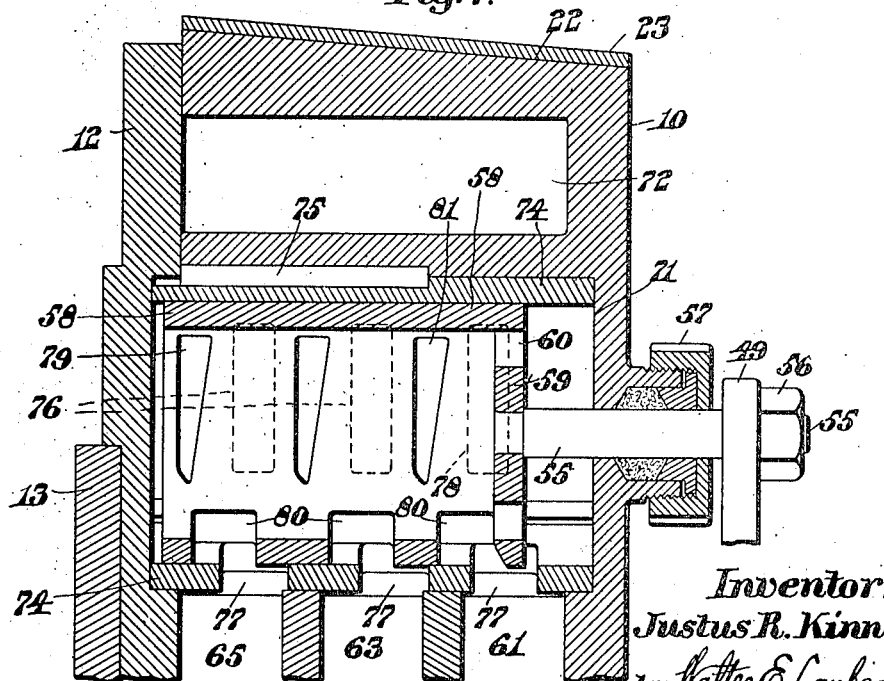
Inventor:
Justus R. Kinney,
by Walter E. Lombard,
Atty.

UNITED STATES PATENT OFFICE.

JUSTUS R. KINNEY, OF ALLSTON, MASSACHUSETTS.

POWER-TRANSMISSION DEVICE.

1,298,512.  Specification of Letters Patent.  Patented Mar. 25, 1919.

Application filed April 13, 1918. Serial No. 228,799.

*To all whom it may concern:*

Be it known that I, JUSTUS R. KINNEY, a citizen of the United States of America, and a resident of Allston, in the county of Suffolk and Commonwealth of Massachusetts, have invented certain new and useful Improvements in Power-Transmission Devices, of which the following is a specification.

This invention relates to power transmission devices, and particularly to a device of this class which is adapted for use on a motor car to transmit motion gradually from the engine to the driving mechanism, and whereby varying speeds may be obtained through the medium of a confined body of fluid.

The invention consists in means for controlling the flow of the fluid in its casing, for the purpose of varying the speed of the driven member during the rotary movement of the driving member, or to permit the free circulation of the fluid in the casing so that no power is transmitted from one member to the other.

The invention further consists in providing the fluid casing with a cone-shaped periphery, which is surrounded by a cup-shaped clutch member keyed to the driven shaft and adapted to be moved into engagement with said periphery when it is desired to transmit rotary movement from the engine to the driven shaft, said cup-shaped member being provided with means for imparting end movement to the fluid-controlling valve whenever said member is moved in either direction.

The invention consists further in certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Figure 1 represents a central longitudinal section of a device embodying the principles of the present invention.

Fig. 2 represents a vertical transverse section of the same on line 2, 2 on Fig. 1.

Fig. 3 represents a vertical transverse section on line 3, 3 on Fig. 1.

Fig. 6 represents a horizontal section on line 6, 6, on Fig. 5, drawn to an enlarged scale, and Fig. 7 represents a vertical section on line 7, 7, on Fig. 5 drawn to an enlarged scale.

Similar characters designate like parts throughout the several figures of the drawings.

Figure 4:
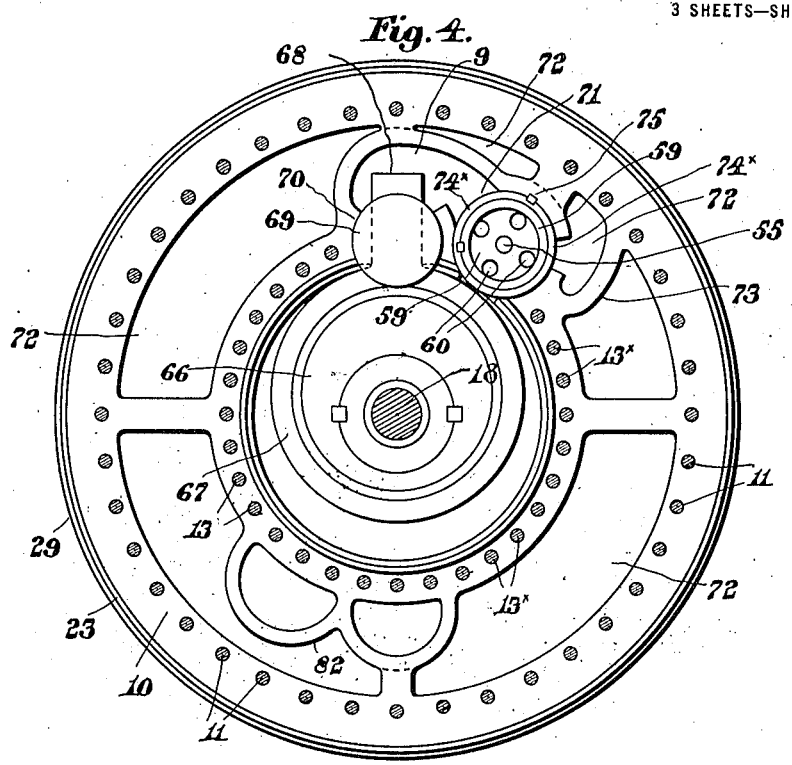
Fig. 4 represents a vertical transverse section on line 4, 4 on Fig. 1.

In the drawings, 10 is a fluid casing member, having secured to one end, by bolts 11, a cover plate 12. This cover plate 12 is provided with a cylindrical recess in its outer face, in which recess is positioned an annular member 13, secured to the casing 10 by bolts 13[x], and having extended therethrough a plurality of bolts 14, the outer ends of which are positioned in holes extending through a peripheral flange 15 formed upon the engine shaft 16.

To the outer ends of the bolts 14 are threaded nuts 17.

The cover plate 12 is provided with a cylindrical projection 18 extending inwardly and positioned in a bushing 19 in the enlarged end 20 of the driven shaft 21. The opposite end of said shaft 21 is adapted to be connected with any suitable mechanism to be driven.

The periphery 22 of the fluid casing 10 is tapered and is provided with a covering 23 of leather, asbestos, or some similar material, which will provide a positive gripping surface.

Keyed to the driven member 21 is a slidable collar 24 having an annular peripheral groove 25 therein and provided with a peripheral flange 26. This flange 26 has a plurality of bolts 27 extending therethrough and threaded to a cup-shaped member 28, the peripheral flange 29 of which has its inner face cone-shaped and surrounding the asbestos peripheral cover 23 of the member 10.

In the groove 25 is positioned a ring 30, formed in two parts, secured together by bolts 31 extending through ears 32 formed on the parts of said ring 30. This ring 30 is provided with diametrical trunnions 33, which extend into slots 34 formed in the bifurcated end 34ˣ of an operating lever 35. This lever 35 is pivoted at 36 and has an upwardly extending arm 37 provided with a foot-pad 38.

When pressure is applied to the foot-pad 38 in the direction of the arrow a, the collar 24 will be moved longitudinally of the shaft 21, and the peripheral flange 29 will be removed from contact with the asbestos cover 23 of the fluid casing 10.

When the flange 29 is thus disengaged from cover 23, further rotary movement from the driving shaft 16 to the driven shaft 21 will be prevented. The shaft 21 has pinned thereto a collar 39, between which and the end of the collar 24 is interposed a spring 40, which will return the flange 29 into engagement with the asbestos frictional cover 23 as soon as pressure is removed from the foot-pad 38.

The inner face of the fluid casing 10 is provided with a hub 41, having a stuffing box 42 therein in which the shaft 21 is adapted to rotate.

Surrounding the hub 41 is an annular hub 43 formed upon the inner face of the cup-shaped member 28 and extending inwardly toward the fluid casing 10. Threaded to the end of the hub 43 is an annular member 44, between which and a shoulder 45 formed upon said cup-shaped member 28 are interposed two rings 46 provided with anti-friction members 47 and between which is positioned a third ring 48. This ring 48 has three arms 49, 50 and 51 radiating therefrom. The arms 50 and 51 are provided with tubular hubs 52 in the ends thereof, through each of which extends a stud 53 mounted in and extending from the fluid casing 10.

The other arm 49 has an opening in the end thereof through which extends the reduced end 54 of the valve stem 55. Threaded to the reduced end 54 is a lock nut 56. The valve stem 55 extends through a stuffing box 57 in the fluid casing 10. The inner end of the valve stem 55 has secured thereto the cup-shaped valve 58, one end of which is open as indicated at the left of Fig. 7, while the opposite end is partially closed by wall 59 having a plurality of openings 60 therethrough.

The casing 10 is provided with a central cylindrical chamber 61, and set into the casing 10 is a cup-shaped member 62, having a cylindical chamber 63, and another cup-shaped member 64 having a cylindrical chamber 65.

The chambers 61, 63 and 65 are all of the same diameter, with their cylindrical walls equi-distant from the axes of the shafts 16 and 21.

Keyed to the enlarged end 20 of the driven shaft 21 are three eccentrics 66, each of which is disposed in a chamber 61, 63 or 65.

Figure 5:
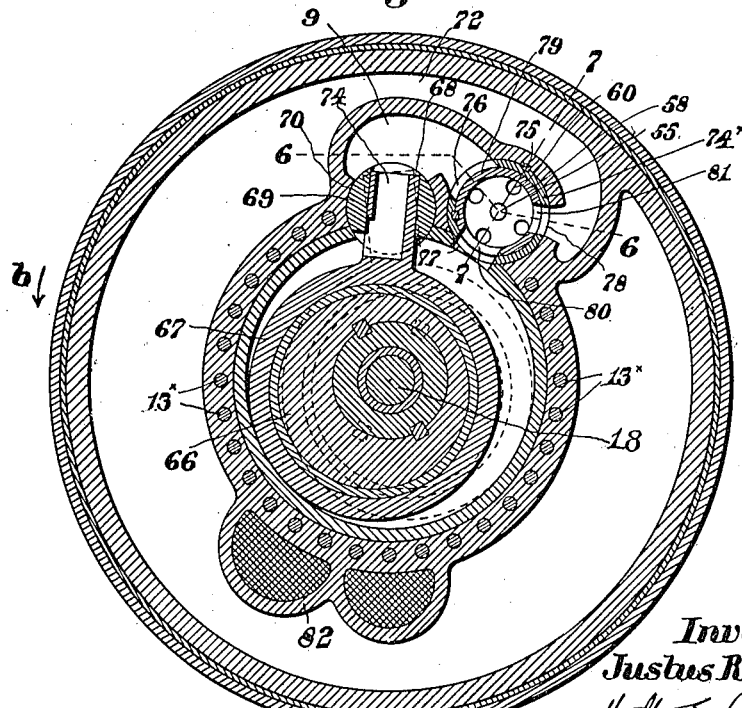
Fig. 5 represents a vertical transverse section on line 5, 5, on Fig. 1.

Each eccentric 66 has mounted thereon an annular piston member 67, and said eccentrics 66 radiate from the axis of the shaft 21 at spaced intervals of 120° as shown in full and dotted lines in Figs. 4 and 5.

Each piston member 67 is provided with a radial blade 68, each blade extending through a diametral slot in a cylindrical oscillating member 69. These slotted oscillating members 69 are disposed in alinement in the cylindrical depression 70 formed in the casing 10. The depression 70 communicates with the cylindrical chambers 61, 63, and 65 and also by the passages 9 with the cylindrical depression 71 in which the sliding valve 58 is positioned.

This depression 71 also communicates with the chambers 61, 63, and 65, and with one end of a connecting passage 72 partially surrounding the cylindrical chambers 61, 63, and 65.

The opposite end of the connecting passage 72 is closed by the wall or abutment 73. The piston blades 68 are each provided with fluid passages 74 extending from the outer ends thereof, the inner ends of said passages communicating with the chambers 61, 63, and 65 at points slightly removed from the peripheries of the pistons 67.

The cup-shaped valve 58 is adapted to be reciprocated in the depression 71 by the reciprocation of the member 28, during which reciprocation the fluid is adapted to pass through the openings 60 in the end wall 59.

The depression 71 is provided with a cylindrical lining 74ˣ, which is prevented from rotating by the key 75. This lining is provided with three sets of ports 76, 77 and 78.

The ports 76 communicate with the passages 9, the ports 77 with the cylindrical chambers 61, 63 and 65, while the ports 78 communicate with the end of the connecting passage 72.

The tubular portion of the valve 58 is also provided with three sets of ports, 79, 80 and 81 coacting respectively with the ports 76, 77 and 78. The ports 81 are arranged to be always in communication with the ports 78 regardless of the position of the valve 58. The ports 80 are also arranged to be in communication at all times with the ports 77, although in the movement of the valve 58 these ports 77 and 78 may be partially closed.

In order to balance the casing 10, chambers 82 are formed therein diametrically opposite the depressions 70, 71, and these chambers are filled with material of sufficient weight to balance the weight of the parts opposite thereto.

The rotation of the casing 10 is in the direction of the arrow $b$ on Fig. 5 of the drawings.

The normal working position of the valve 58 is that shown in Figs. 6 and 7, with the ports 76 closed, and when in this position all circulation of the fluid in the chambers 61, 63 and 65 is prevented, thereby causing the driven shaft 21 to be rotated at the same, or substantially the same speed as the engine shaft 16 and in the same direction therewith.

When it is desired to start the car, the operator depresses the foot pad 38, thus disengaging the clutch parts 29 and 23, and immediately after this disengagement moving the sliding valve 58 so that the ports 76 are fully opened.

The distance between the rings 46 is slightly in excess of the thickness of the ring 48, so that the clutch members 29, 23 will always be engaged or disengaged before the valve 58 is moved in either direction.

When the ports 76 have been fully opened, the fluid will be free to circulate from the chambers 61, 63, and 65 through the passages 74 and 9 and depression 71, and also through the connecting passage 72, and no rotary movement will be imparted to the driven shaft 21 by the driving or engine shaft 16 when the engine has been started.

If the operator gradually permits the treadle lever 37 to return to its normal position, the circulation of the fluid in the casing will be gradually retarded, and consequently the speed of the driven shaft will be increased proportionately until by the action of the spring 40 the sliding part 29 has been moved into gripping contact with the member 23 on the periphery 22 of the fluid casing 10 and locked thereto.

It is obvious that at any one time while the engine is running the speed of the driven member 21 may be changed at will by simply actuating the treadle lever 37 and partially closing the ports 76, thus gradually building up a pressure in the chambers 61, 63, and 65.

When the casing 10 is moved in the direction of the arrow $b$ on Fig. 5 of the drawings, the oil in the connecting passage 72 will be forced in the opposite direction, and through the ports 78, 81 and ports 77, 80 into the chambers 61, 63 and 65, thus keeping these chambers completely filled with fluid at all times and under all conditions.

When the ports 76, 79 are open the fluid is permitted to freely pass from the chambers 61, 63, and 65 through the passages 74 into the valve 58, from which said fluid may pass into the chambers 61, 63, and 65 through the ports 77, 80, or into the connecting passage 72 through the ports 78, 81.

When the device is in operation, the discharge ports 76, 79 are closed, and the foot is off the foot-pad 38 of the treadle lever 37. At this time there is a clear passage through the valve 58 from the passage 72 to the chambers 61, 63 and 65.

When it is desired to stop a car to which said device is attached, the treadle 38 is depressed, thereby opening the discharge ports 76, 79 and permitting the pressure in the chambers 61, 63 and 65 to be released. While the ports 76, 79 are being opened, the ports 77, 80 are being partially closed, thus gradually shutting off the supply of oil to the chambers 61, 63 and 65, and thus permitting the fluid clutch to idle more easily.

Before the valve 58 is moved to open the ports 76, 79, the clutch member 29 will be disengaged from the friction lock 23, and these two members will be free from contact when the ports 76, 79 begin to open.

By means of this device any required speed may be attained and the speed varied at will, or all power disconnected from the driven shaft.

The cup-shaped member 28 is closed and as the valve actuating members are all inclosed within this member 28, dirt and other foreign substances are prevented from entering the interior of said member 28 and interfering with the operation of said actuating members.

It is obvious that the projection 18 positioned in the recess in the end of the driven shaft 21 insures perfect alinement of the shafts 16—21 at all times.

By extending the bolts 13× through the entire fluid casing 10, the cover plate 12 and the cylindrical plate 13 at points adjacent to the cylindrical walls of the chambers 61, 63, and 65 greater rigidity is retained and leakage from said chambers is effectually prevented.

By providing the valve actuating ring 48 with the additional arms 50, 51, with the hubs 52 on the outer ends thereof slidably mounted on the studs 53 all cramping of said ring 48 in its reciprocation is entirely obviated.

The positioning of the bolts 14 in the cylindrical plate 13 with their heads abutting the bottom of the depression in the outer face of the cover plate 12 prevents the accidental displacement of said bolts.

While the device is described as applied to a motor car it is equally applicable for use on motor boats and for many other purposes.

The device is very compact occupying but little space and may be readily assembled and when once placed in operation the main operating parts are so well protected that there is very slight opportunity for the various instrumentalities to be placed out of commission.

It is believed that the operation and many advantages of this invention will be fully understood from the foregoing description.

Having thus described my invention, I claim:

1. In a device of the class described, the combination of a driving shaft; a fluid clutch, one part of which is secured to said driving shaft and is provided with a single controlling valve having a plurality of ports for the passage of fluid; a driven shaft alined with said driving shaft and supporting the other part of said fluid clutch; a friction clutch member keyed to and slidable on the driven shaft; means for normally retaining said friction clutch member in engagement with the fluid clutch casing; and means for disengaging said friction clutch member from the fluid clutch casing and positively moving said valve endwise whereby its ports may be opened.

2. In a device of the class described, the combination of a driving shaft; a fluid clutch, one part of which is secured to said driving shaft and is provided with a single controlling valve having a plurality of ports for the passage of fluid; a driven shaft alined with said driving shaft and supporting the other part of said fluid clutch; a friction clutch member keyed to and slidable on the driven shaft; means for normally retaining said friction clutch member in engagement with the fluid clutch casing; and means for disengaging said friction clutch member from the fluid clutch casing and positively moving said valve endwise whereby its ports may be opened at a predetermined interval after the disengagement of said friction clutch.

3. In a device of the class described, the combination of a driving shaft; a fluid clutch one part of which, consisting of a casing having a tapered periphery, is secured to said driving shaft and is provided with a single controlling valve having a plurality of ports for the passage of fluid; a driven shaft alined with said driving shaft and supporting the other part of said fluid clutch; a friction clutch member keyed to and slidable on the driven shaft, and having an annular flange adapted to coact with the tapered periphery of said casing; means for normally retaining said friction clutch member in engagement with the fluid clutch casing; and means for disengaging said friction clutch member from the fluid clutch casing and positively moving said valve endwise whereby its ports may be opened.

4. In a device of the class described, the combination of a driving shaft; a fluid clutch one part of which, consisting of a cylindrical casing, is secured to said driving shaft and is provided with a single controlling valve having a plurality of ports for the passage of fluid; a locking covering for the periphery of said casing; a driven shaft alined with said driving shaft and supporting the other part of said fluid clutch; a cup-shaped friction clutch member keyed to and slidable on the driven shaft and adapted to coact with said locking covering; means for normally retaining said friction clutch member in engagement with the fluid clutch casing; and means for disengaging said friction clutch member from the fluid clutch casing and positively moving said valve endwise whereby its ports may be opened.

5. In a device of the class described, the combination of a driving shaft; a fluid clutch one part of which is secured to said driving shaft and is provided with a single controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub having a peripheral groove therein; a ring in said groove to which said actuator is secured; means for normally retaining said friction clutch member in engagement with the fluid clutch casing; and means for disengaging said friction clutch member from the fluid clutch casing and positively moving said valve endwise whereby its ports may be opened.

6. In a device of the class described, the combination of a driving shaft; a fluid clutch one part of which is secured to said driving shaft and is provided with a single controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub having a peripheral groove therein; a ring in said groove to which said actuator is secured, said ring having a thickness less than the width of said groove; means for normally retaining said friction clutch member in engagement with the fluid clutch casing; and means for disengaging said friction clutch member from the fluid clutch casing and positively moving said valve endwise whereby its ports may be opened.

7. In a device of the class described, the combination of a driving shaft; a fluid clutch one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub having a peripheral groove therein; a ring in said groove to which said actuator is secured; means for varying the width of said groove; means for normally retaining said friction clutch member in engagement with the fluid clutch casing; and means for disengaging said friction clutch member from the fluid clutch casing and positively moving said valve whereby its ports may be opened.

8. In a device of the class described, the combination of a driving shaft; a fluid clutch one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub having a peripheral groove therein; a ring in said groove to which said actuator is secured; an annular member forming one wall of said groove adjustable endwise of said hub; means for normally retaining said friction clutch member in engagement with said fluid clutch casing; and means for disengaging said friction clutch member from the fluid clutch casing and positively moving said valve whereby its ports may be opened.

9. In a device of the class described, the combination of a driving shaft; a fluid clutch one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub having a peripheral groove therein; a ring in said groove to which said actuator is secured; an annular member forming one wall of said groove threaded to and adjustable endwise of said hub; means for normally retaining said friction clutch member in engagement with the fluid clutch casing; and means for disengaging said friction clutch member from the fluid clutch casing and positively moving said valve whereby its ports may be opened.

10. In a device of the class described, the combination of a driving shaft; a fluid clutch, one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub having a peripheral groove therein; a ring in said groove to which said actuator is secured; anti-friction members in said grooves on opposite sides of said ring; means for normally retaining said friction clutch member in engagement with the fluid clutch casing; and means for disengaging said friction clutch member from the fluid clutch casing and positively moving said valve whereby its ports may be opened.

11. In a device of the class described, the combination of a driving shaft; a fluid clutch, one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft and provided with a hub extending inwardly toward the fluid clutch and having a peripheral groove therein; a ring in said groove to which said actuator is secured; anti-friction members in said groove on opposite sides of said ring; means for normally retaining said friction clutch member in engagement with fluid clutch casing; and means for disengaging said friction clutch member from the fluid clutch casing and positively moving said valve whereby its ports may be opened.

12. In a device of the class described, the combination of a driving shaft; a fluid clutch, one part of which is secured to said driving shaft and is provided with a single controlling valve having a plurality of ports for the passage of fluid; a driven shaft alined with said driving shaft and supporting the other part of said fluid clutch; a closed cup-shaped friction clutch member keyed to and slidable on the driven shaft the annular flange of which is adapted to coact with the periphery of the fluid casing; means for normally retaining said friction clutch member in engagement with the casing; and means partially inclosed within said cup-shaped member for disengaging said friction clutch member from the fluid clutch casing and positively moving said valve endwise whereby its ports may be opened.

13. In a device of the class described, the combination of a driving shaft; a fluid clutch, one part of which is secured to said driving shaft and is provided with a single controlling valve having a plurality of ports for the passage of fluid; a driven shaft alined with said driving shaft and supporting the other part of said fluid clutch; a friction clutch member keyed to and slidable on the driven shaft; a collar on said driven shaft; a spring interposed between said collar and friction clutch member, and normally retaining said friction clutch member in engagement with said fluid clutch casing; and means for disengaging said friction clutch member from the fluid clutch casing and positively moving said valve endwise whereby its ports may be opened.

14. In a device of the class described, the combination of a driving shaft; a fluid clutch, one part of which is secured to said driving shaft and is provided with a single controlling valve having a plurality of ports for the passage of fluid; a driven shaft alined with said driving shaft and supporting the other part of said fluid clutch; a friction clutch member keyed to and slidable on the driven shaft; a collar on said driven shaft; a spring interposed between said collar and friction clutch member, and normally retaining said friction clutch member in engagement with said fluid clutch casing; and means under the control of the operator for disengaging said friction clutch member from the fluid clutch casing and positively moving said valve endwise whereby its ports may be opened.

15. In a device of the class described, the combination of a driving shaft; a fluid clutch one part of which is secured to said driving shaft and is provided with a single controlling valve having a plurality of ports for the passage of fluid; a driven shaft alined with said driving shaft and supporting the other part of said fluid clutch; a friction clutch member keyed to and slidable on the driven shaft; a collar on said driven shaft; a spring interposed between said collar and friction clutch member, and normally retaining said friction clutch member in engagement with said fluid clutch casing; and a pivoted lever for disengaging said friction clutch member from the fluid clutch casing and positively moving said valve endwise whereby its ports may be opened.

16. In a device of the class described, the combination of a driving shaft; a fluid clutch, one part of which is secured to said driving shaft and is provided with a single controlling valve having a plurality of ports for the passage of fluid, said fluid clutch having formed integral therewith a tapered annular friction surface; a driven shaft alined with said driving shaft and supporting the other part of said fluid clutch; a friction clutch member keyed to and slidable on the driven shaft having an annular flange adapted to coact with said tapered surface; means for normally retaining said friction clutch member in engagement with the fluid clutch casing; and means for disengaging said friction clutch member from the fluid clutch casing and positively moving said valve endwise whereby its ports may be opened.

17. In a device of the class described, the combination of a driving shaft; a fluid clutch one part of which, consisting of a casing having a tapered periphery, is secured to said driving shaft and is provided with a single controlling valve having a plurality of ports for the passage of fluid; a driven shaft alined with said driving shaft and supporting the other part of said fluid clutch; a sleeve keyed to and slidable on the driven shaft and having a peripheral flange; a friction clutch member bolted to said sleeve and having an annular flange adapted to coact with the tapered periphery of said casing; means for normally retaining said friction clutch member in engagement with the fluid clutch casing; and means partially inclosed within said friction clutch member for disengaging said friction clutch member from the fluid clutch casing and positively moving said valve endwise whereby its ports may be opened.

18. In a device of the class described, the combination of a driving shaft; a fluid clutch one part of which, consisting of a cylindrical casing, is secured to said driving shaft and is provided with a controlling valve having a plurality of ports for the passage of fluid; a driven shaft alined with said driving shaft and supporting the other part of said fluid clutch said shaft having a cylindrical axial recess in its inner end; a cup-shaped friction clutch member keyed to and slidable on the driven shaft and adapted to inclose said casing; a cover plate for said casing bolted to the driving shaft, and having an axial cylindrical projection positioned in said recess; means for normally retaining said friction clutch member in engagement with the fluid clutch casing; and means for disengaging said friction clutch member from the fluid clutch casing and positively moving said valve whereby its ports may be opened.

19. In a device of the class described, the combination of a driving shaft; a fluid clutch one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft; means controlled by the movement of said friction clutch member for operating said valve actuator; means for normally retaining said friction clutch member in engagement with the fluid clutch casing; means for disengaging said friction clutch member from the fluid clutch casing and positively moving said valve whereby its ports may be opened; a cover plate bolted to said fluid clutch casing having a depression in its outer face; a cylindrical plate fixedly positioned in said depression; a peripheral flange on the end of the driving shaft; and bolts in said cylindrical plate and extending outwardly through the flange of said driving shaft.

20. In a device of the class described, the combination of a driving shaft; a fluid clutch one part of which is secured to said driving shaft and is provided with a controlling valve having a plurality of ports for the passage of fluid; an actuator for said valve; a driven shaft alined with said driving shaft and supporting the other part of said fluid clutch; a friction clutch member keyed to and slidable on the driven shaft; means controlled by the movement of said friction clutch member for operating said valve actuator; means for normally retaining said friction clutch member in engagement with the fluid clutch casing; means for disengaging said friction clutch member from the fluid clutch casing and positively moving said valve whereby its ports may be opened; a cover plate bolted to said fluid clutch casing having a depression in its outer face; a cylindrical plate fixedly positioned in said depression; a peripheral flange on the end of the driving shaft; bolts in said cylindrical plate and extending outwardly through the flange of said driving shaft; and locking bolts extending through said fluid casing, cover plate, and cylindrical plate.

Signed by me at 4 Post Office Square, Boston, Mass. this 10th day of April, 1918.

JUSTUS R. KINNEY.

Witnesses:
WALTER E. LOMBARD,
NATHAN C. LOMBARD.